(12) United States Patent
Jeong

(10) Patent No.: US 7,400,369 B2
(45) Date of Patent: Jul. 15, 2008

(54) TRANSFLECTIVE LIQUID CRYSTAL DISPLAY DEVICE AND METHOD OF FABRICATING THE SAME

(75) Inventor: Hoon Jeong, Gyeongsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 275 days.

(21) Appl. No.: 11/142,365

(22) Filed: Jun. 2, 2005

(65) Prior Publication Data
US 2005/0206815 A1 Sep. 22, 2005

Related U.S. Application Data

(62) Division of application No. 10/438,855, filed on May 16, 2003, now Pat. No. 6,927,819.

(30) Foreign Application Priority Data
May 23, 2002 (KR) .............................. 2002-28742

(51) Int. Cl.
*G02F 1/1335* (2006.01)
(52) U.S. Cl. .................. 349/114; 349/106; 349/113
(58) Field of Classification Search ............... 349/106, 349/114
See application file for complete search history.

(56) References Cited

U.S. PATENT DOCUMENTS

| | | | |
|---|---|---|---|
| 6,063,527 A | 5/2000 | Nishikawa et al. | |
| 6,154,265 A | 11/2000 | Kamio et al. | |
| 6,522,377 B2 * | 2/2003 | Kim et al. | 349/114 |
| 6,639,639 B2 | 10/2003 | Baek et al. | |
| 6,697,138 B2 | 2/2004 | Ha et al. | |
| 6,956,632 B2 * | 10/2005 | Ozawa et al. | 349/114 |
| 2001/0004276 A1 | 6/2001 | Urabe et al. | |
| 2002/0003596 A1 * | 1/2002 | Kim | 349/106 |
| 2002/0097356 A1 * | 7/2002 | Kawase et al. | 349/106 |
| 2002/0101552 A1 | 8/2002 | Yi et al. | |

* cited by examiner

*Primary Examiner*—Huyen Ngo
(74) *Attorney, Agent, or Firm*—Morgan, Lewis & Bockius LLP

(57) ABSTRACT

A method of fabricating a transflective liquid crystal display device includes providing first and second substrates that include a plurality of unit pixels divided into a transmission part and a reflection part, forming a first color filter unit by applying a first color pigment in the transmission part of the first substrate, forming a second color filter unit by applying a transparent material and a second color pigment in the reflection part of the first substrate, and attaching the first substrate and a second substrate together.

7 Claims, 7 Drawing Sheets

TRANSFLECTIVE LIQUID CRYSTAL DISPLAY DEVICE AND METHOD OF FABRICATING THE SAME

This application is a Divisional of U.S. patent application Ser. No. 10/438,855, filed May. 16, 2003, now U.S. Pat. No. 6,927,819, and claims the benefit of Korean Patent Application No. 28742/2002 filed in Korea on May 23, 2003, which are hereby incorporated by reference.

BACKGROUND OF THE INVENTION

1. Field of the Invention

The present invention relates to a liquid crystal display device, and more particularly, to a transflective liquid crystal display device and method of fabricating a transflective liquid crystal display device.

2. Discussion of the Related Art

In general, display devices require low power consumption, high picture quality, thin profile, and light weight. Presently, liquid crystal display (LCD) devices are replacing conventional cathode ray tubes (CRTs).

In common liquid crystal display devices, an image is displayed by light radiated from a light source, i.e., a back-light device located on a lower part of a liquid crystal display panel. However, the amount of light actually transmitting through the liquid crystal display panel is about 7% of the light generated from the back-light device. Accordingly, a significant amount of the light produced by the back-light device is absorbed or blocked by the liquid crystal display panel. Thus, power consumption of the back-light is increased.

In order to solve the power consumption problem of the back-light device, reflective liquid crystal display devices that do not use the back-light device are being developed. These reflective liquid crystal display devices use natural light, thereby reducing power consumption of the back-light device, and thus allow portable use of the liquid crystal display devices. The reflective liquid crystal display devices make use of ambient light by reflecting the ambient light using an opaque material having reflective property within pixel areas of the liquid crystal display devices.

However, the ambient light is not always available. Accordingly, the reflective liquid crystal display devices can only be effectively used where an abundance of ambient light is available, and cannot be used in low light or dark environments. Thus, transflective liquid crystal display devices, which combine advantages of the reflective liquid crystal display devices using the natural light and of the transmission liquid crystal display devices using the back-light device, are being developed. The transflective liquid crystal display devices can be easily converted into reflection mode and transmission mode device by user selection.

In general, the transflective liquid crystal display devices simultaneously function like both the transmission mode liquid crystal display devices and the reflective mode liquid crystal display devices. Accordingly, the user may be able to use the light of the back-light device and the ambient light. Thus, operation of the transflective liquid crystal display devices is dictated or limited by environmental conditions, and the power consumption can be reduced.

FIG. 1 is a perspective view of a transflective liquid crystal display device according to the related art. In FIG. 1, a transflective liquid crystal display device comprises a color filter substrate 10 having a transparent common electrode 8 formed on a black matrix 6 and a color filter 7, a pixel area P having a pixel electrode 18 divided into a transmission part 16 and a reflection part 17, and an array substrate 20 having a switching device S and gate and data lines 13 and 14. In addition, a liquid crystal material layer 30 is formed between the color filter substrate 10 and the array substrate 20.

FIG. 2 is a partial cross sectional view of a transflective liquid crystal display device according to the related art. In FIG. 2, the array substrate 20 and the color filter substrate 10 having the switching device S and the color filter 7 on two transparent substrates 5 and 15 are disposed to face each other, respectively. In addition, the liquid crystal material layer 30 is formed between the array substrate 20 and the color filter substrate 10.

The switching device S is formed on the array substrate 20 and is disposed in a pixel region for supplying and blocking a signal voltage to the liquid crystal material layer 30. The switching device S includes a gate electrode 21 to which a scan signal is supplied, an active layer 23 having a semiconductor layer 23a activated in response to the scan signal to form a channel, and an n$^+$ doped ohmic contact layer 23b that is formed on both sides of the semiconductor layer 23a, a gate insulating layer 24 for electrically insulating the active layer 23 from the gate electrode 21, a source electrode 24 formed on the active layer 23 to which a data signal is input, and a drain electrode 25 transmitting the data signal input to the source electrode 24 to the pixel electrode when the semiconductor layer 23a is activated. In addition, a passivation layer 26 is formed on an entire surface of the array substrate 20 for protecting the source electrode 24 and the drain electrode 25. Moreover, a contact hole 29 is formed on the passivation layer 26 to electrically connect the drain electrode 25 to the pixel electrode 27.

The black-matrix 6 is formed within an area of the color filter substrate 10 corresponding to the area where the switching device S is formed in order to block the light and prevent it from being transmitted into areas above the black matrix 6. In addition, the pixel electrode 27, which is connected to the drain electrode 25 through the contact hole 29, is formed on the pixel region P (in FIG. 1) except at the portion where the switching device S is formed, and a reflective electrode 28 made of a metal having high reflection properties is formed on the pixel electrode 27.

A portion of the reflective electrode 28 is removed to form a transmitting portion 16 having a width t. As described above, the transmission part 16 is formed within the pixel region P, whereby the light input from a direction of the transparent substrate 5 is reflected by the reflection electrode 28 and emitted along the same direction of the transparent substrate 5 in the reflection mode. In addition, the light emitted from the back-light device adjacent to the transparent substrate 15 is transmitted through the transmission part 16 in the transmission mode to produce an image.

A concave recess portion is formed within the area where the transmission part 16 is formed by removing portions of the passivation layer 26 and the reflection electrode 28. The transmission part 16 is formed to have a concave recess shape in order to match ON/OFF modes of the reflection part and the transmission part 16 and to maximize the efficiency of the transmission mode. In addition, it is desirable that a ratio between a cell gap d2 of the transmission part 16 and a cell gap d1 of the reflection part is to be 2:1, that is, d2 is to be twice d1. Accordingly, the transmission efficiencies on the reflection part and on the transmission part 16 are theoretically the same.

However, in the transflective liquid crystal display device according to the related art, the switching device S formed on the array substrate 20 is adversely affected by the process of etching the passivation layer 26 on the array substrate 20.

Accordingly, inferiority of the switching device S may be generated. For example, the switching device S, the gate insulating layer 22, the passivation layer 26, and the transparent electrode 27 formed on the array substrate 20 are affected by the process of forming the step in the passivation layer 26.

SUMMARY OF THE INVENTION

Accordingly, the present invention is directed to a transflective liquid crystal display device that substantially obviates one or more of the problems due to limitations and disadvantages of the related art.

An object of the present invention is to provide a transflective liquid crystal display device having an optimal image property showing same color purity and transmission rate both in a reflection mode and in a transmission mode.

Another object of the present invention is to provide a transflective liquid crystal display device for preventing inferiority during fabrication processing and for simplifying fabrication processes.

Another object of the present invention is to provide a method for fabricating a transflective liquid crystal display device having an optimal image property and for preventing inferiority during fabrication processing.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, A method of fabricating a transflective liquid crystal display device includes providing first and second substrates that include a plurality of unit pixels divided into a transmission part and a reflection part, forming a first color filter unit by applying a first color pigment in the transmission part of the first substrate forming a second color filter unit by applying a transparent material and a second color pigment in the reflection part of the first substrate, and attaching the first substrate and a second substrate together.

In another aspect, a method of fabricating a transflective liquid crystal display device includes providing first and second substrates that include a plurality of unit pixels divided into a transmission part and a reflection part, etching a portion of the transmission part of the first substrate to a predetermined thickness, forming a first color filter unit by applying a color pigment on the etched portion, forming a second color filter unit by applying the color pigment in the reflection part of the first substrate so that a first cell gap of the transmission part is larger than a second cell gap of the reflection part, forming a passivation layer on the second substrate, patterning a transparent electrode and a reflection electrode on the second substrate upon which the passivation layer is formed, and attaching the first substrate and the second substrate together.

In another aspect, a transflective liquid crystal display device includes first and second substrates that include a plurality of unit pixels which are divided into a transmission part and a reflection part, a color filter including a first color filter unit in the transmission part and a second color filter unit in the reflection part so that a first cell gap of the transmission part is larger than a second cell gap of the reflection part, a switching device on the second substrate, a passivation layer on an entire surface of the second substrate upon which the switching device is formed, a transparent electrode and a reflection electrode on the second substrate upon which the passivation layer is formed, and a liquid crystal material layer between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the exemplary embodiments of the present invention, examples of which are illustrated in the accompanying drawings.

Figure 1:
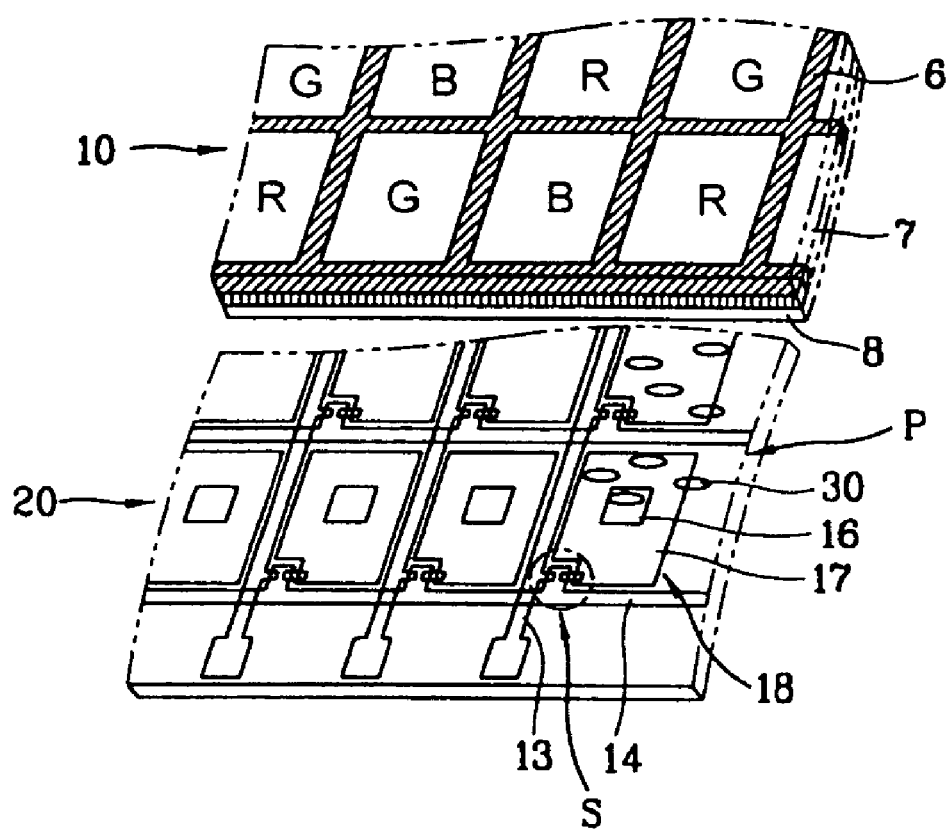
FIG. 1 is a perspective view of a transflective liquid crystal display device according to the related art.
Figure 2:
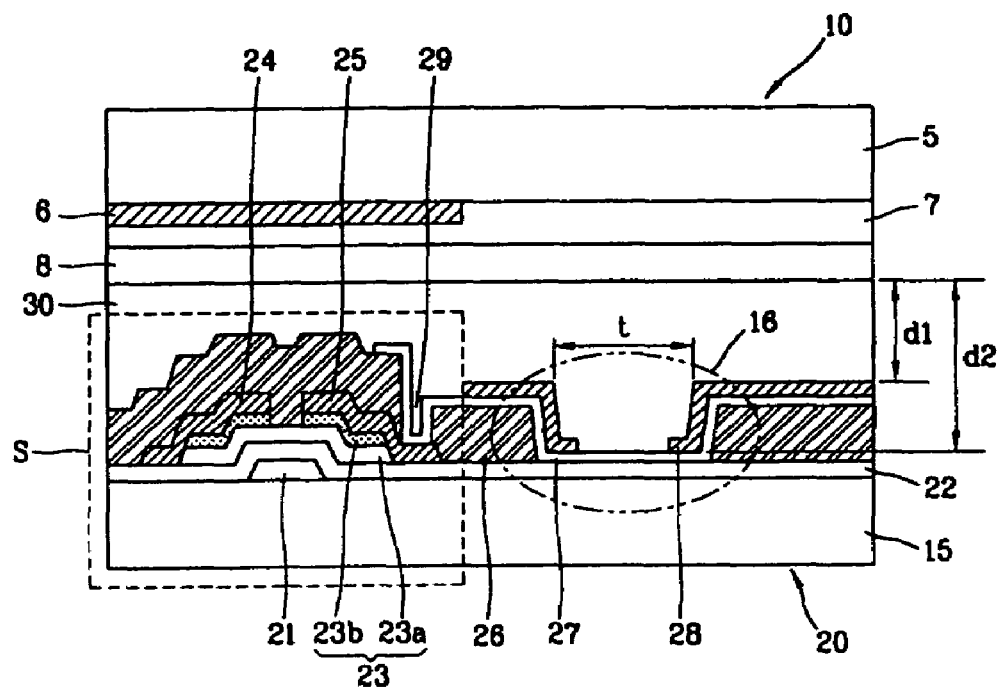
FIG. 2 is a partial cross sectional view of a transflective liquid crystal display device according to the related art.
Figure 3A:
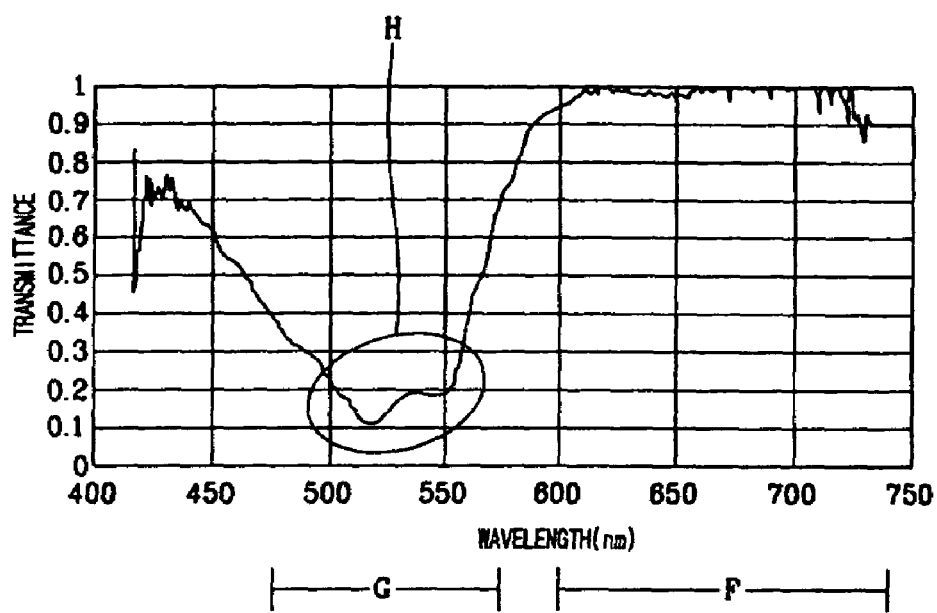
FIGS. 3A and 3B are graphs showing transmittance versus wavelength of a red color filter according to the present invention.
Figure 3B:
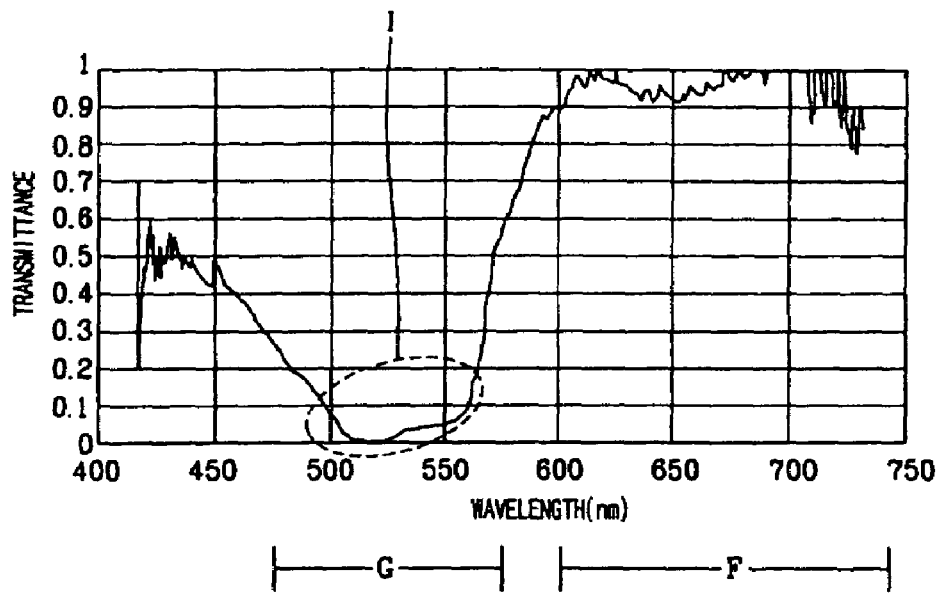

FIGS. 3A and 3B are graphs showing transmittance versus wavelength of a red color filter according to the present invention. In FIG. 3A, when light is transmitted through a red color filter having a discretionary thickness L, the light of wavelength band (F) corresponding to the red color has a transmittance of nearly 1. However, the complete absorption characteristic is not shown on the wavelength band (G) corresponding to other colors, i.e., the transmittance (H) larger than 0.1 is shown. Thus, the light corresponding to the wavelength band except the red color is also transmitted as mixed with the light corresponding to the wavelength band of the red color.

On the contrary, when the thickness of the red color filter is to be 2×L, the transmittance of the light corresponding to the red color wavelength band is hardly changed. However, the transmittance (I) of the light in the wavelength band of 500 to 560 nm is nearly 0, in FIG. 3B.

As described above, the transmittance of the light transmitting the color filter is changed according to the thickness of the color filter. For the transmission mode in the transflective liquid crystal display device, the light emitted from a back-light device is viewed after passing through the color filter once. For the reflection mode, the light input through the color filter from an upper side into the liquid crystal display device is reflected on the reflection electrode and is viewed after passing through the color filter for a second time. Thus, the first light passing through the transmission part is colored once and the second light passing through the reflection part is colored twice, whereby different color purities are created for the first and second lights. For example, assuming that the thickness of the color filter is L, and that the transmittance characteristic in FIG. 3A is represented for the transmission mode and the transmittance characteristic in FIG. 3B is represented for the reflection mode, then there is a difference between the color purities.

To solve this problem, the color purity of the light passing through the transmission part can be made to be the same as that of the light passing the reflection part by putting more pigment in the color resin to differentiate the thickness of the color filter on the portion corresponding to the transmission part. For example, the thickness of the color filter corresponding to the transmission part is to be twice as much as that of the color filter corresponding to the reflection part. When the thickness of the color filter on the transmission part is to be 2×L, and the thickness of the color filter on the reflection part is formed to be L, the transmittance feature in FIG. 3B can be obtained in both transmission and reflection modes and the same color purity can be represented.

Thus, the present invention suggests a method for obtaining same color purity and same transmittance both on the reflection mode and the transmission mode by forming the color filter having different thickness on the color filter substrate to control the cell gaps of the reflection part and of the transmission part.

Figure 4:
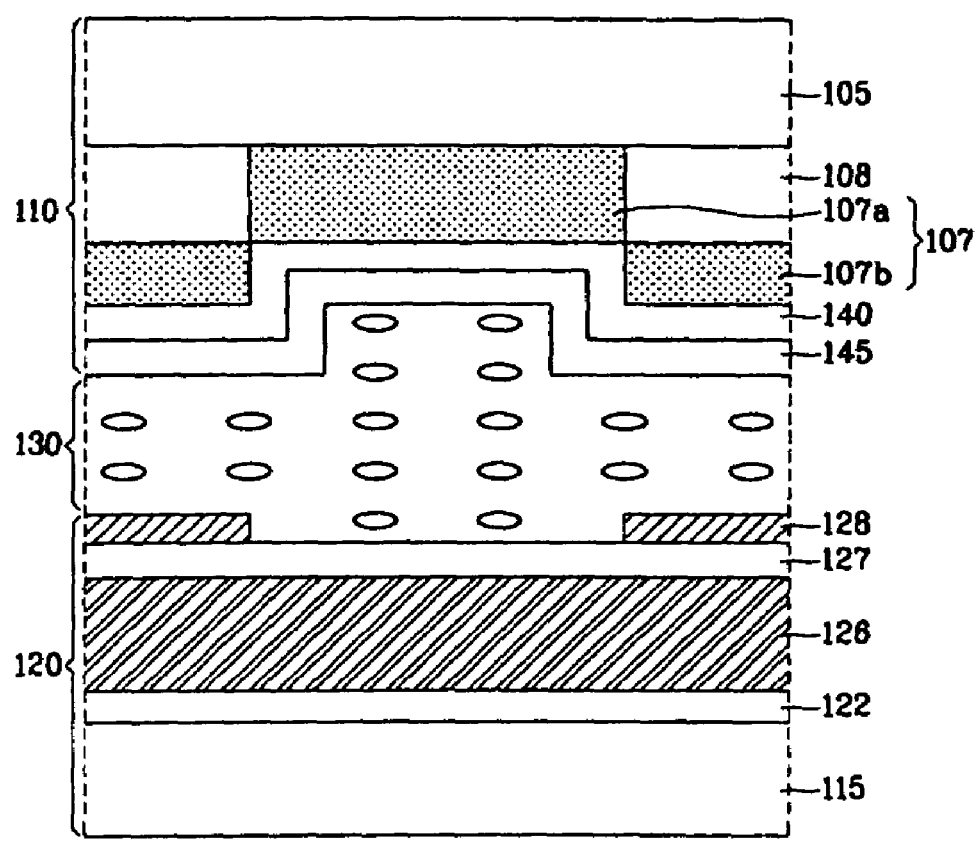
FIG. 4 is a partial cross sectional view of an exemplary transflective liquid crystal display device according to the present invention.

FIG. 4 is a partial cross sectional view of an exemplary transflective liquid crystal display device according to the present invention. In FIG. 4, the switching device is omitted for convenience. In FIG. 4, a color filter 107 having a step may be formed on a transparent substrate 105 of a color filter substrate 110. Specifically, a color filter 107b corresponding to a reflection part may protrude into a liquid crystal material layer 130 region more than a color filter 107a corresponding to the transmission part. In addition, a coating layer 140 and a transparent electrode 145 may be formed on the color filters 107a and 107b.

An exemplary method of fabricating the color filter of FIG. 4 may include forming a black matrix pattern 128 on a transparent substrate 115, then forming red, green, and blue patterns for realizing colors during a pigment dispersion method. The pigment dispersion method uses a negative photoresist (PR), wherein during a development process a developer may remove the non-exposed portion. The development process may include a dipping, a puddle, or a shower spray method, and the color filter patterns may be fixed by performing a post-bake process.

Figure 5A:
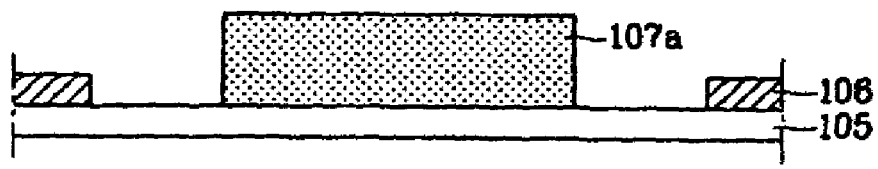
FIGS. 5A through 5C are cross sectional views of an exemplary fabrication process for color filters according to the present invention.
Figure 5B:
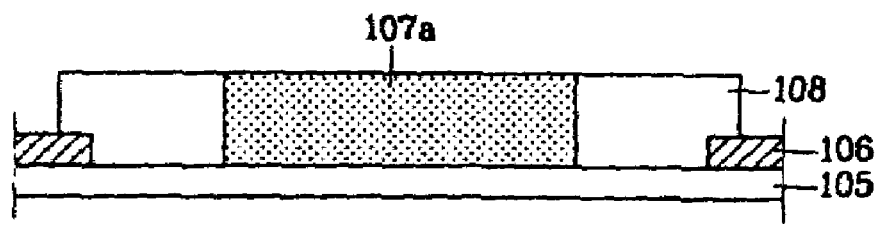
Figure 5C:
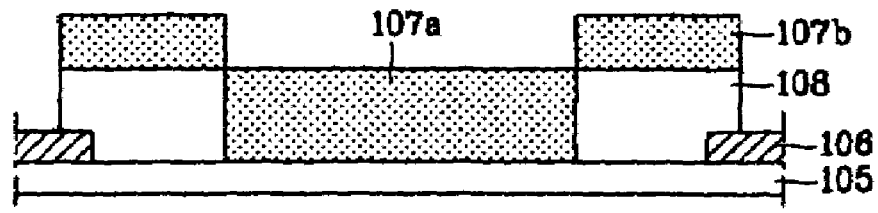

FIGS. 5A through 5C are cross sectional views of an exemplary fabrication process for color filters according to the present invention. In FIGS. 5A to 5C, the fabrication process of a red color sub-pixel will be described as an example. In FIG. 5A, a black matrix 106 pattern may be formed on a transparent substrate 105, then the color filter 107a corresponding to the transmission part of the red color sub-pixel pattern may be formed. Next, the green and blue color sub-pixel patterns of the transmission part may be formed by shift exposing a mask (not shown) after changing the pigment repeatedly. Next, the red color sub-pixel pattern may be fixed by a post-bake process.

In addition, a transparent material 108 may be formed on the black matrix 106 and the transparent substrate 105 at opposing side portions of the color filter 107a at a predetermined thickness using the mask (in FIG. 5B). The thickness of the transparent material 108 may be controlled to make the cell gap of the transmission part twice as thick as that of the reflection part. The transparent material 108 may includes an organic resin or an acrylic resin.

In FIG. 5C, the color filter 107b corresponding to the reflection part of the red color sub-pixel pattern may be formed and patterned by selectively etching the color pigment after applying the color pigment on portions of the transparent material 108. The patterned color filter 107b may be fixed by performing the post-bake process. Then, the mask may be shifted to form the green and blue color sub-pixel patterns of the reflection part. Accordingly, a thickness of the color filter 107a on the transmission part may be made to be twice as thick as that of the color filter 107b on the reflection part. Thus, the transmittance of light may be the same in both the reflection mode and the transmission mode. If pigments having different transmittances are used for the reflection part and for the transmission part, the thickness of the cell gap and of the color filter may be more flexibly controlled.

Another method for forming the color filter may be to print red, green, and blue color inks on the substrate using various other printing methods. The printing methods may include screen-printing, offset printing, and graphic printing methods. Therefore, the color filter may be sequentially formed in FIG. 5 using the printing methods.

Figure 6:
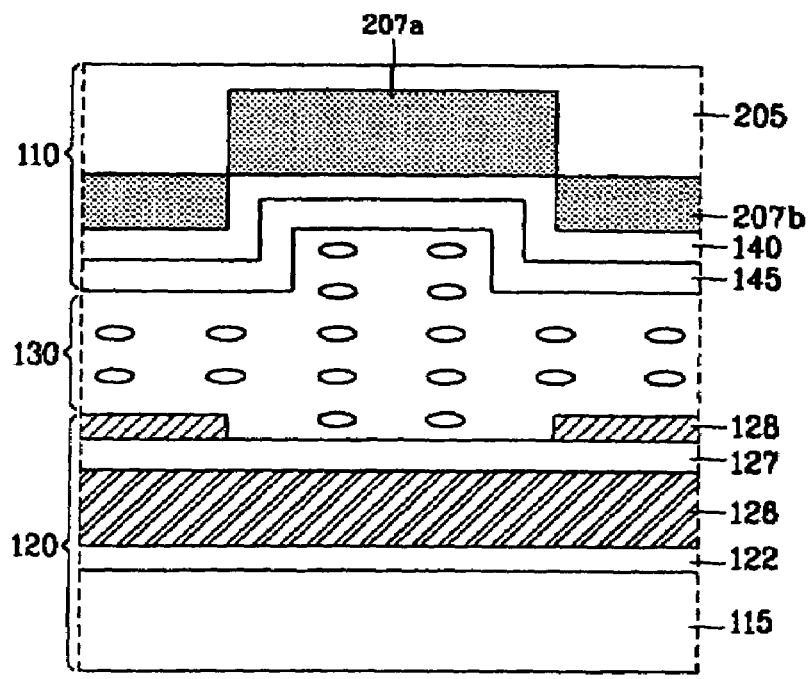
FIG. 6 is a partial cross sectional view of another exemplary transflective liquid crystal display device according to the present invention.

After forming a coating layer 140 on the color filter substrate upon which the red, green, and blue color sub-pixel patterns may be formed, a transparent electrode 145, such as an indium tin oxide (ITO), may be deposited on entire surface of the color filter substrate 110 to functions as a common electrode for driving the liquid crystal cell (in FIG. 4). In addition, a gate insulating layer 122, a passivation layer 126, a pixel electrode 127, and a reflection electrode 128 may be formed on an array substrate facing the completed color filter substrate 110. A part of the reflection electrode 128 facing toward the color filter 107a of the transmission part on the color filter substrate 110 may be removed in order to form the transmission part in the pixel region. Then, a liquid crystal material layer 130 may be formed between the color filter substrate 110 and the array substrate 120. However, this fabrication process may be problematic in that an addition mask process for forming the color filters on the transmission part and FIG. 6 is a partial cross sectional view of another exemplary transflective liquid crystal display device according to the present invention. The exemplary embodiment may have a same structure as that of the liquid crystal display device of the FIGS. 4 and 5A to 5C, except for the structure of the color filter portion on the color filter substrate. Thus, descriptions for the same components as those of the liquid crystal display device in FIGS. 4 and 5 to 5C are omitted, and new components of the exemplary embodiment will be described. Hereinafter, same reference numerals are used for the same components as those of FIG. 4.

In FIG. 6, after etching a part of a transparent substrate 205 corresponding to the transmission part to be a predetermined thickness in order to construct the transmission part, a color filter 207a may be formed on the etched portion by applying the color pigment onto the entire substrate and by selectively patterning. Then, the color pigment may be applied again and the part corresponding to the reflection part may be selectively patterned to form the color filter 207b corresponding to the reflection part on both sides of the transmission part. The color filters 207a and 207b may be formed by the pigment dispersion method or by the printing method.

The thickness of the color filter 207a on the transmission part may be determined by a degree of etching of the substrate, and the thickness of the color filter 207b on the reflection part may also be determined. The cell gap of the transmission part may be made to be twice as thick as that of the reflection part using the step generated on the above two portions. If the step is formed on the color filter substrate in order to make the cell gap of the transmission part thicker than that of the reflection part as in the embodiments of FIGS. 4 and 5A to 5C and FIG. 6, then distortion of an electric field may be generated due to the step of the electrodes when the voltage is applied to the liquid crystal display device. Thus, the aligning direction of the liquid crystal material may not be uniform on the stepped portion and light leakage may be generated. The light leakage may function as an element interrupting a contrast on the screen, and therefore, it may be desirable that the step of the color filters generated on the boundary of transmission part and reflection part may be small. In order to make the step smaller, the following method is described.

Figure 7:
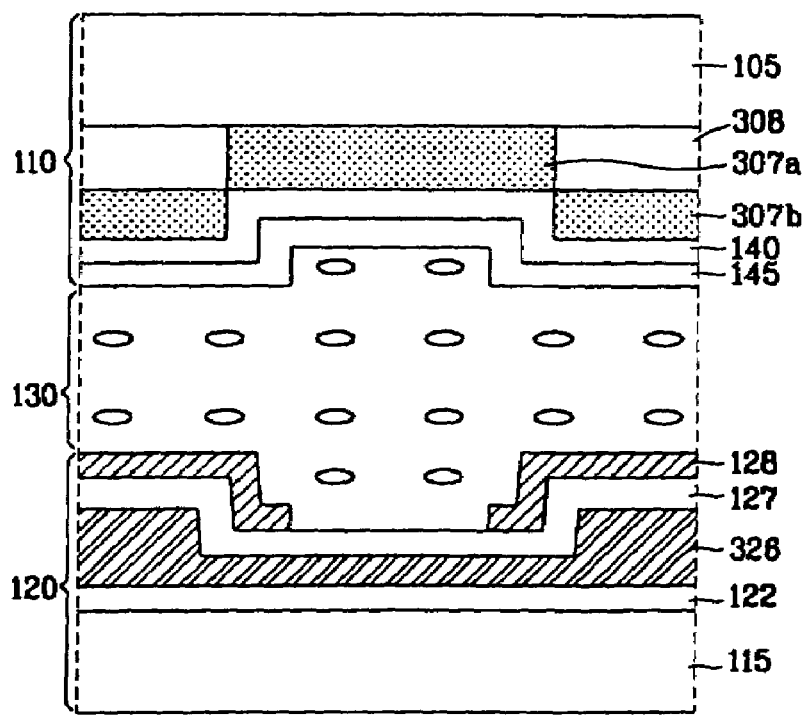
FIG. 7 is a partial cross sectional view of another exemplary transflective liquid crystal display device according to the present invention.

FIG. 7 is a partial cross sectional view of another exemplary transflective liquid crystal display device according to the present invention. In FIG. 7, a thickness of a transparent material 308 may be reduced and a passivation layer 326 of an array substrate 120 may be etched as much as the reduced thickness to form cell gaps of reflection and transmission parts. The passivation layer 326 corresponding to the transmission part of the array substrate 120 may be etched some or whole so that the cell gap of the transmission part is twice as thick as that of the reflection part.

Therefore, the step of the color filter substrate caused by the difference of thickness between the color filter 307a on the transmission part and the color filter 307b on the reflection part of the color filter substrate 110 may be reduced, and therefore, the light leakage generated on the stepped portion can be reduced.

Figure 8:
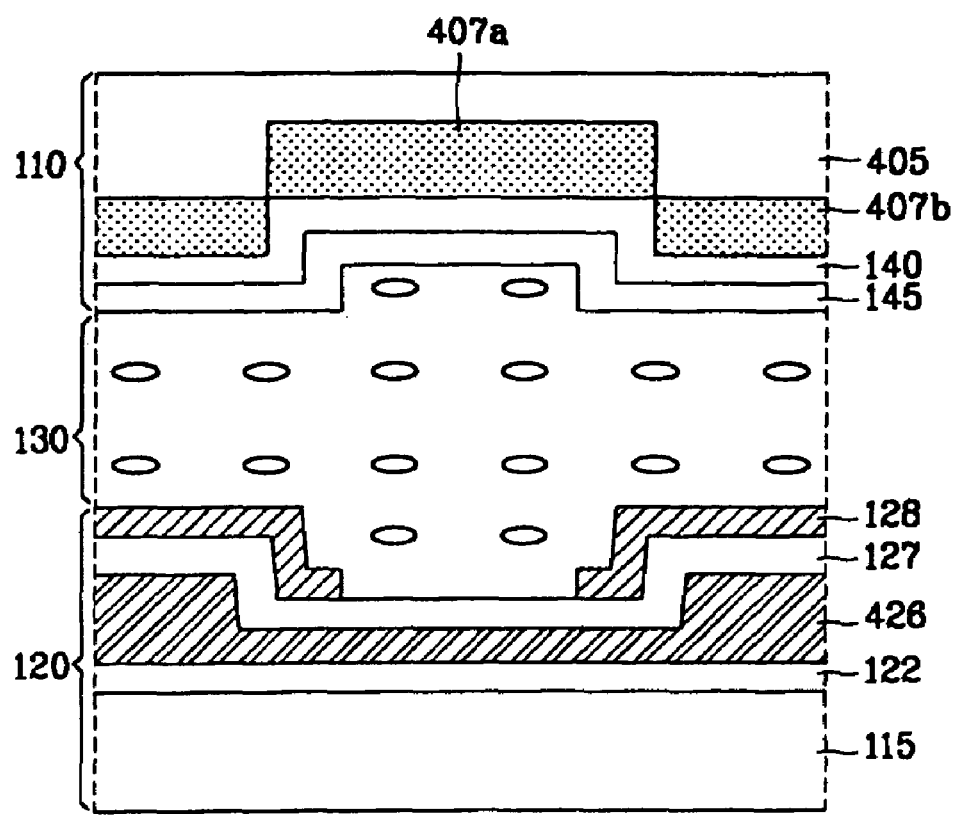
FIG. 8 is a partial cross sectional view of another exemplary transflective liquid crystal display device according to the present invention.

FIG. 8 is a partial cross sectional view of another exemplary transflective liquid crystal display device according to the present invention. In FIG. 8, an etched thickness of a transparent substrate 405 on a color filter substrate 110 may be reduced from a fabrication method of the embodiment of FIG. 6, and a passivation layer 426 of the array substrate 120 may be etched as much as the reduced thickness to form the cell gap of the transmission part. The passivation layer 426 corresponding to the transmission part of the array substrate 120 may be etched some or whole so that the cell gap of the transmission part is twice as thick as that of the reflection part.

Therefore, the step of the color filter substrate 110 caused by the difference of the thickness between the color filter 407a on the transmission part and the color filter 407b on the reflection part of the color filter substrate 110, and therefore, the light leakage generated on the stepped portion can be prevented.

The steps formed on the reflection part and the transmission part of the color filter substrate in the embodiments of FIGS. 7 and 8 may be reduced less than those of the embodiments of FIGS. 4 and 6. When the step may be formed on the array substrate, inferiority may be generated easily during the fabrication process since the step is large. However, when the step may be also formed on the color filter substrate as in the above embodiments, the inferiority can be reduced less than that of the above case during the process since the step on the array substrate is reduced.

Also, the surface of the substrate may be flattened, and therefore, the image property may be improved, and the light leakage due to the step on the electrode can be prevented.

It will be apparent to those skilled in the art that various modifications and variations can be made in the transflective liquid crystal display device and the method of fabricating the same of the present invention without departing from the spirit or scope of the invention. Thus, it is intended that the present inventions cover the modifications and variations of this invention provided they come within the scope of the appended claims and their equivalents.

What is claimed is:

1. A transflective liquid crystal display device, comprising:
   first and second substrates that include a plurality of unit pixels which are divided into a transmission part and a reflection part;
   a color filter including a first color filter unit in the transmission part of the first substrate and a second color filter unit in the reflection part of the first substrate so that a first cell gap of the transmission part is larger than a second cell gap of the reflection part,
   wherein the first color filter unit includes a first color pigment layer and
   wherein the second color filter unit includes a transparent material layer and a second color pigment layer, the transparent material layer having an upper surface parallel with an upper surface of the first color pigment layer and the second color pigment layer disposed exclusively on the upper surface of the transparent material layer;
   a switching device on the second substrate;
   a passivation layer on an entire surface of the second substrate upon which the switching device is formed;
   a transparent electrode and a reflection electrode on the second substrate upon which the passivation layer is formed; and
   a liquid crystal material layer between the first substrate and the second substrate.

2. The liquid crystal display device according to claim 1, wherein the first color filter unit is thicker than the second color filter unit.

3. The liquid crystal display device according to claim 1, wherein the thickness of the second color pigment layer on the second color filter unit is one-half of the thickness of the first color pigment layer on the first color filter unit.

4. A transflective liquid crystal display device, comprising:
   first and second substrates that include a plurality of unit pixels which are divided into a transmission part and a reflection part, wherein a portion of the transmission part of the first substrate is etched to a predetermined thickness;
   a color filter including a first color filter unit on the etched portion of the first substrate and a second color filter unit on the etched portions of the first substrate in the reflection part of the first substrate so that a first cell gap of the transmission part is larger than a second cell gap of the reflection part,
   wherein the first color filter unit includes a first color pigment layer and
   wherein the second color filter unit includes a second color pigment layer, the first substrate having an upper surface parallel with an upper surface of the first color pigment layer and the second color pigment layer disposed exclusively on the etched portions of the first substrate;
   a switching device on the second substrate;
   a passivation layer on an entire surface of the second substrate upon which the switching device is formed;

a transparent electrode and a reflection electrode on the second substrate upon which the passivation layer is formed; and a liquid crystal material layer between the first substrate and the second substrate.

5. The liquid crystal display device according to claim 4, wherein the transmission part of the first substrate is etched to a predetermined thickness so that the first color filter unit is formed on the etched portion.

6. The liquid crystal display device according to claim 4, wherein the transmission part of the second substrate is etched to a predetermined thickness.

7. The liquid crystal display device according to claim 4, wherein the first color filter unit is thicker than the second color filter unit.

* * * * *